United States Patent
Whittaker (10) Patent No.: US 10,491,464 B2
(45) Date of Patent: *Nov. 26, 2019

(54) NETWORK TOPOLOGY ASSISTED DEVICE PROVISIONING

(71) Applicant: Amazon Technologies, Inc., Seattle, WA (US)

(72) Inventor: Colin John Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/589,792

(22) Filed: May 8, 2017

(65) Prior Publication Data

US 2017/0331679 A1  Nov. 16, 2017

Related U.S. Application Data

(63) Continuation of application No. 14/290,851, filed on May 29, 2014, now Pat. No. 9,647,882.

(51) Int. Cl.
*G06F 15/16* (2006.01)
*H04L 12/24* (2006.01)

(52) U.S. Cl.
CPC .......... *H04L 41/0803* (2013.01); *H04L 41/08* (2013.01); *H04L 41/0806* (2013.01); *H04L 41/12* (2013.01)

(58) Field of Classification Search
CPC . H04L 41/0803; H04L 41/08; H04L 41/0806; H04L 41/12
See application file for complete search history.

(56) References Cited

U.S. PATENT DOCUMENTS

| | | | |
|---|---|---|---|
| 7,702,732 B1 | 4/2010 | Squire | |
| 8,370,463 B2 | 2/2013 | Squire | |
| 8,381,193 B2 * | 2/2013 | Cervantes | H04L 41/069 715/204 |
| 8,713,135 B1 | 4/2014 | Adogla et al. | |
| 8,782,183 B2 | 7/2014 | Squire | |
| 8,966,293 B1 * | 2/2015 | Dutch | G06F 3/0625 713/300 |
| 9,392,010 B2 * | 7/2016 | Friedman | H04L 63/102 |
| 9,841,962 B2 * | 12/2017 | Whitney | H04L 67/10 |

(Continued)

OTHER PUBLICATIONS

Richard H. Galliher, III, et al., U.S. Appl. No. 13/252,712, Dynamic Network Device Configuration, filed Oct. 4, 2011.

*Primary Examiner* — Moustafa M Meky
(74) *Attorney, Agent, or Firm* — Knobbe Martens Olson & Bear, LLP (57) ABSTRACT

Systems and methods for managing configuration of network devices are provided. In one embodiment, a network device management service can obtain relevant device-specific information, deployment information, and network topology data associated with a network device to be provisioned. The network device management service can enable generating, identifying or obtaining configuration metadata based on relevant network topology data as well as other applicable information. The network device management service can further generate configuration instructions to facilitate configuration of network devices based on configuration metadata.

21 Claims, 5 Drawing Sheets

(56) References Cited

U.S. PATENT DOCUMENTS

| | | | |
|---|---|---|---|
| 2004/0107277 A1* | 6/2004 | Levesque | H04L 41/082 |
| | | | 709/223 |
| 2005/0111394 A1 | 5/2005 | Jung | |
| 2006/0277299 A1 | 12/2006 | Baekelmans | |
| 2008/0056161 A1 | 3/2008 | Okita | |
| 2008/0215668 A1 | 9/2008 | Hu | |
| 2009/0070455 A1* | 3/2009 | Cervantes | H04L 41/069 |
| | | | 709/224 |
| 2009/0327903 A1 | 12/2009 | Smith | |
| 2010/0228837 A1 | 9/2010 | Squire | |
| 2015/0012626 A1 | 1/2015 | Squire | |

\* cited by examiner

NETWORK TOPOLOGY ASSISTED DEVICE PROVISIONING

CROSS-REFERENCE TO RELATED APPLICATION

This application is a continuation of U.S. patent application Ser. No. 14/290,851, entitled NETWORK TOPOLOGY ASSISTED DEVICE PROVISIONING, and filed May 29, 2014, now U.S. Pat. No. 9,647,882, the entirety of which is incorporated by reference herein.

BACKGROUND

Generally described, computing devices utilize a communication network, or a series of communication networks, to exchange data. Companies and organizations operate computer networks that interconnect a number of network devices to support operations or provide services to third parties. To facilitate data transmission, the computer networks are made up of multiple physical networks, or sub-networks, that exchange data. Generally, the physical networks include a number of networking devices configured to receive data from a source network component and forward the data to a recipient network component. To identify recipient network components, the networking devices utilize a table of values specifying network forwarding information (hereinafter "routing table") for data traveling thereby. In many cases, networking devices have limited hardware resources, such as memory or other associated storage medium, to accommodate larger routing tables.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings. The drawings are provided to illustrate example embodiments described herein and are not intended to limit the scope of the inventions disclosed herein. Throughout the drawings, reference numbers may be re-used to indicate correspondence between referenced elements.

DETAILED DESCRIPTION

Generally described, aspects of the present disclosure relate to the configuration of networking or network devices. More specifically, aspects of the present disclosure relate to embodiments of a network device management service for managing routing table resources in networking devices, generally referred to as provisioning network devices. In one aspect, this disclosure is directed to generating, identifying, or obtaining configuration metadata based on relevant network topology. In another aspect, this disclosure is directed to causing provisioning of a network device based on the configuration metadata.

In one embodiment, network devices, such as hardware routers, may have limited resources, such as memory capacity for storing routing tables. For example, some network devices may not have sufficient memory to maintain the entirety of routing table information. In another example, other network devices may maintain routing table information over different forms of memory or storage media that impact the performance of such network devices. Accordingly, the network device management service may facilitate an efficient allocation, optimization or partitioning of network device memory to better manage available network device memory, which will generally be referred to as efficient allocation.

Illustratively, an efficient allocation, or partitioning of network device memory can be based on configuration metadata generated based on network topology data related to a deployment of the network device. The configuration metadata can provide lower or upper bounds of memory required for a corresponding routing table, criteria for memory allocation, one or more schemes or layouts of the corresponding routing table and any other information that may assist in the process of memory allocation or partitioning. Given applicable information included in the configuration metadata, the network device management service may determine a configuration of the network device, such as an executable physical or logical allocation or partitioning of memory of a specific size that is dedicated to storing a routing table.

Illustratively, the configuration metadata can be manually inputted by a client. Alternatively or in addition, the network device provisioning system can automatically generate one or more aspects of the configuration metadata. In one embodiment, configuration instructions for a specific network device can be generated based on the configuration metadata. The configuration instructions can be transmitted to the network device and cause provisioning of the network device in an efficient way.

Various implementations, combination and applications for provisioning network devices assisted by network topology will be described in accordance with a networked computing environment. However, these embodiments and examples are illustrative in nature and should not be construed as limiting.

Overview of an Example Embodiment

Figure 1A:
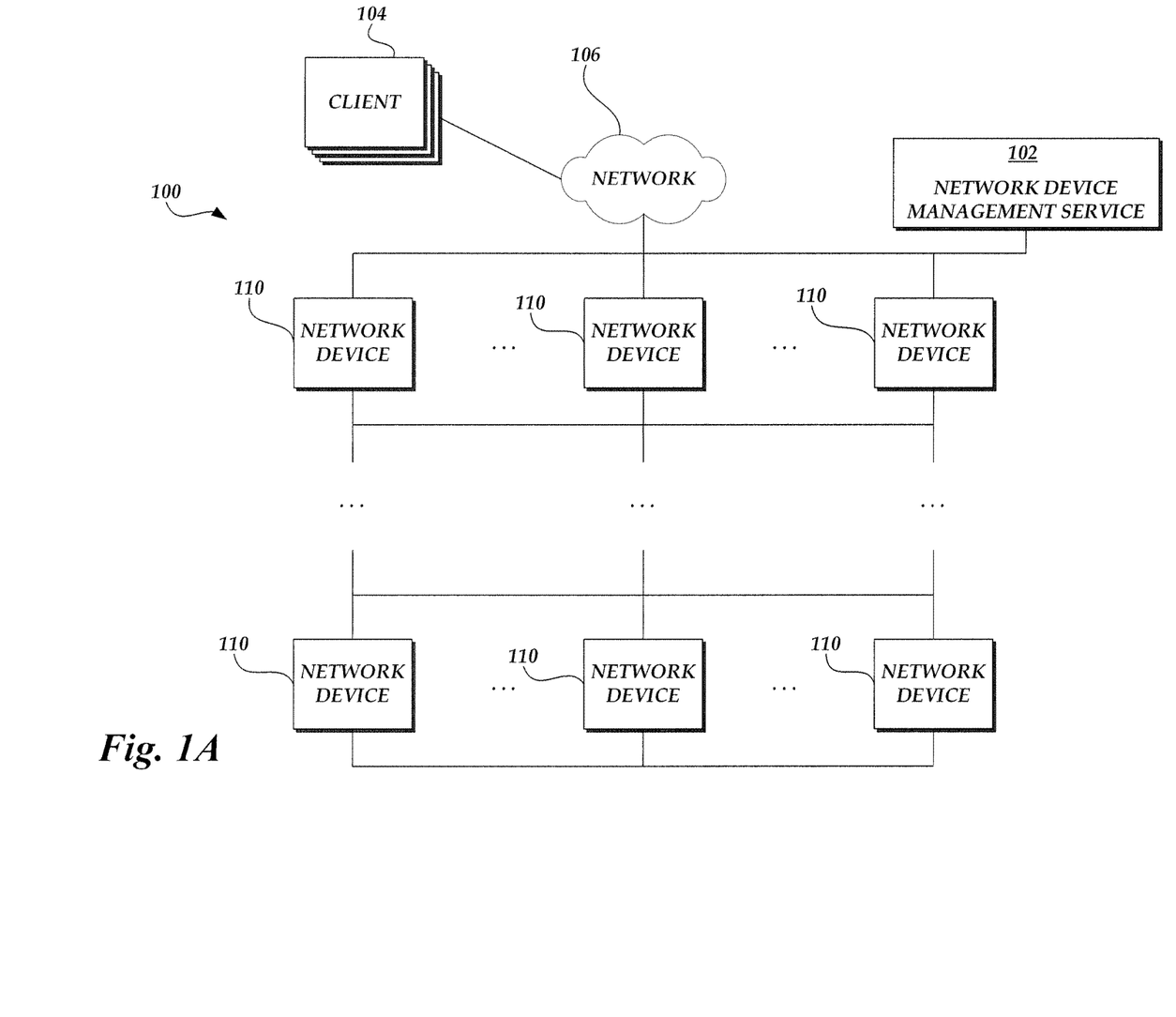
FIG. 1A is a block diagram illustrative of one embodiment of a networked computing environment including a network device management service.

FIG. 1A is a block diagram illustrative of one embodiment of a networked computing environment 100 including a network device management service 102 for provisioning network devices assisted by network topology. Specifically, the network device management service 102 can manage and configure routers, switches or other network devices that request configuration data (e.g., during startup or a reconfiguration process) on the networked computing environment 100. The network device management service 102 can also communicate with clients 104 exchanging provisioning related information such as network topology data, configuration metadata, or network device information.

In one embodiment, the network device management service 102 can correspond to one or more computing devices in communication with one or more other components of the networked computing environment 100. Illustrative computing devices can include server computing devices, personal computing devices or other computing devices that include a processor, memory and other components for executing instructions associated with the function of the network device management service 102. In another embodiment, the network device management service 102 may be implemented as a software component that is executed on one or more of network devices 110.

Illustratively, the network device management service 102 can maintain, store, or update network topology data associated with the networked computing environment 100. For example, the network device management service 102 can receive a desired network topology configuration, such as Clos networks, regular mesh, hypercube, ring, 3D cube, 2D or 3D torus, as well other topologies and variations thereof, created by a network design system. The network device management service 102 can also learn or update network topology data based on information related to deployment or decommission of network devices, configuration metadata, or routing data that are communicated thereto.

With continued reference to FIG. 1A, a communication network 106 may encompass any suitable combination of networking hardware and protocols necessary to establish communications to the networked computing environment 100. For example, the communication network 106 may include private networks such as local area networks (LANs) or wide area networks (WANs) as well as public or private wireless networks. In such an embodiment, the communication network 106 may include hardware (e.g., modems, routers, switches, load balancers, proxy servers, etc.) and software (e.g., protocol stacks, accounting software, firewall/security software, etc.) that establishes a networking link with the networked computing environment 100. Additionally, the communication network 104 may implement one of various communication protocols for transmitting data between computing devices. The communication protocols can include protocols that define data flow information, such as network address information corresponding to the Internet Protocol version 4 (IPv4) or the Internet Protocol version 6 (IPv6) Internet Layer communication network protocols. The networked computing environment 100 may be applicable with additional or alternative protocols and that the illustrated examples should not be construed as limiting.

In communication with the communication network 106 are one or more network devices 110. The network devices 110 can receive incoming data from a component of the network 106 or another network device 110 and forward the data to still another component of the network 106 or network device 110. Such network devices 110 can include, but are not limited to, switches, routers, and the like. Illustratively, the network devices 110 utilize a routing table, which forms the basis for the data forwarding described above. In one embodiment, the routing table is maintained locally on the network device 110, such as in the device's local memory, e.g., RAM, ROM or other persistent memory. In another embodiment, the routing table is stored, entirely or partially, at a remote storage location to which the network device has access. In an illustrative embodiment, the network devices 110 in FIG. 1A may correspond to a computing device having processing resources, memory resources, networking interfaces, and other hardware/software for carrying, processing, or forwarding data in the networked computing environment 100. In another illustrative embodiment, the network device 100 may correspond to a software virtual machine executed by one or more hardware network devices, serving equivalent or similar functions.

Also in communication with the communication network 106 are one or more client computing devices 104 (hereinafter "clients.") Clients 104 may communicate, via the network 106, with the network device management service 102, network devices 110, or other components of the networked computing environment 100. Clients 104 may include any computing system or device that can facilitate such communications. These computing devices can generally include, without limitation, wireless mobile devices (e.g., smart phones, PDAs, tablets, or the like), desktops, laptops, video game platforms, electronic book readers, television set-top boxes, televisions (e.g., internet TVs), and computerized appliances. Further, clients 104 can include one or more hardware processors capable of implementing any type of software or application (such as a browser or a mobile media application) that can facilitate such communications.

The networked computing environment 100 may also include further components that may not be depicted in FIG. 1. For example, the network device management service 102 may be provided by various computing systems or devices implementing computer-executable instructions, such as network servers, application servers, database servers, combinations of the same, or the like, configured to receive and respond to requests from clients 104 or network devices 110.

Figure 1B:
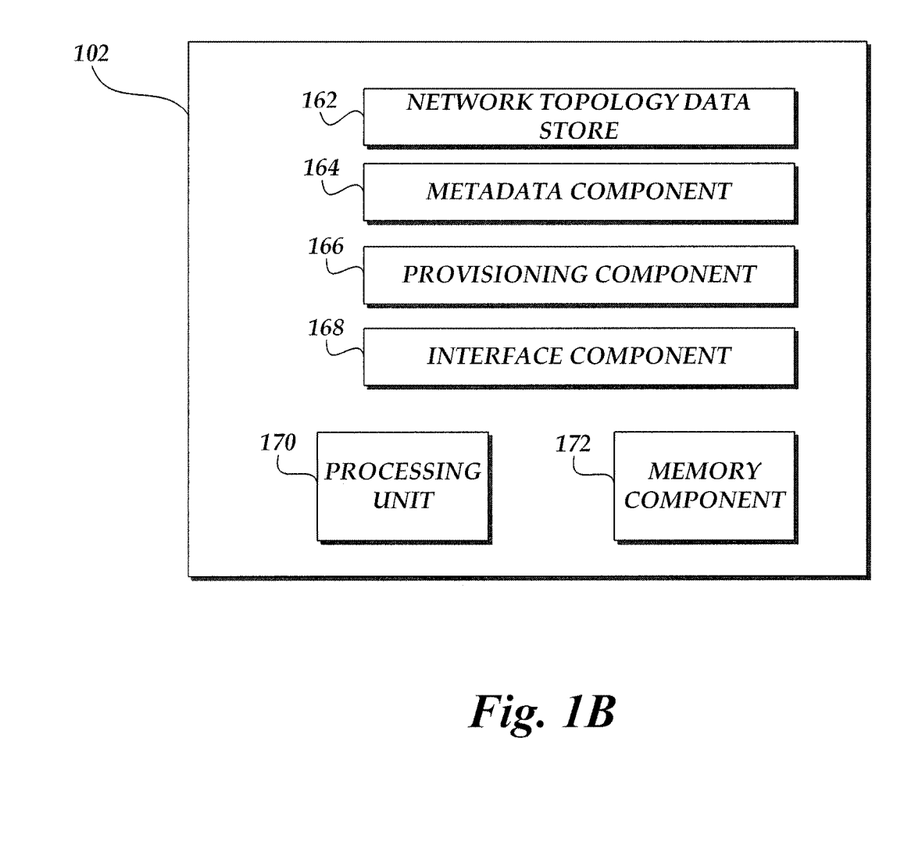
FIG. 1B is a block diagram illustrative of example components of a network device management service utilized in accordance with the networked computing environment of FIG. 1A.

With reference now to FIG. 1B, a block diagram illustrative of components of a network device management service 102 utilized in accordance with the networked computing environment 100 of FIG. 1A will be described. The network device management service 102 may include many more (or fewer) components than those shown in FIG. 1B.

As illustrated in FIG. 1B, the network device management service 102 can include a network topology data store 162. The network topology data store 162 can generally include any repository, database or information storage system that can store data relating to network topology. The network topology data store 162 can store information related to an actual, estimated, or expected topology or topologies of one or more networks or portions of networks (e.g., sub networks), including information related to how network devices of a particular network or portion of a network are interconnected with each other. For example, the network topology data store 162 can store data on how the network devices on a network are actually or expected to be laid out, identifying information about network devices in the network, bandwidth, latencies or other attributes associated with different routes or hops.

The network device management service 102 can also include a metadata component 164. The metadata component 164 may generate configuration metadata, such as lower or upper bounds of memory required for a corresponding routing table, criteria for memory allocation, one or more schemes or layout of the corresponding routing table and any other information that may facilitate provisioning of network devices. Configuration metadata may also include any information contributing to the allocation of any hardware or software resources associated with a network device. The metadata generation may be based on relevant network topology data retrieved from the network topology data store 162, device-specific information associated with a network device to be provisioned, client requests or other applicable information. The metadata component 164 may also obtain, organize or convert configuration metadata provided by clients 104. The metadata component 164 may further include one or more data stores for storing configuration metadata, which may be indexed or otherwise organized to facilitate efficient retrieval.

The network device management service 102 can further include a provisioning component 166. The provisioning component 166 may generate configuration instructions for provisioning a network device, based on configuration metadata. The configuration instructions may be transmitted from the network device management service 102 to a network device 110. Upon applicable conversion, such as being compiled by a local compiler, the configuration instructions can be executed by the network device 110 for provisioning itself. Alternatively, or in addition, the configuration instructions can be transmitted to a client 104 that requests provisioning of a network device. Further, the provisioning component 166 or another component of the network device management service 102 may execute the configuration instructions and cause a network device 110 to be provisioned.

Still further, the network device management service 102 may include an interface component 168. The interface component 168 may communicate with clients 104, network devices 110, or any other components of the networked computing environment 100. Such communications may include exchange of any data related to network topology, configuration metadata, configuration instructions, network devices, client requests, as well as other data that can be envisioned by a person of skill in the art.

In addition, the network device manager service 102 may include at least a processing unit 170, which may also be associated with a memory component 172 such as RAM, ROM or other persistent memory. The memory component 172 can contain computer program instructions that the processing unit executes in order to facilitate or accomplish functions of the network device service 102.

Example Network Device Configuration Process

Figure 2:
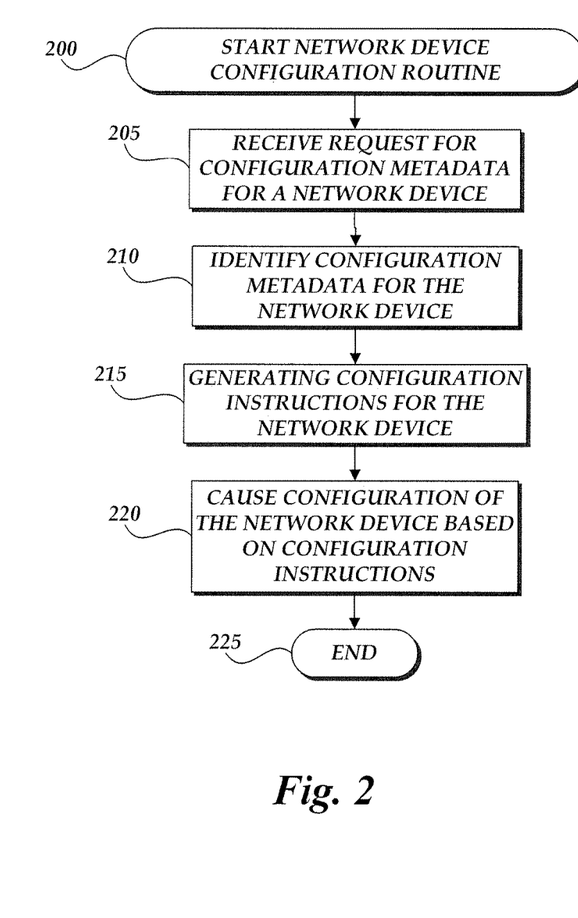
FIG. 2 is a flow diagram illustrative of an embodiment of a network device configuration routine.

FIG. 2 is a flow diagram illustrative of an embodiment of a network device configuration routine 200. Routine 200 can be implemented by one or more components of the network device management service 102, for example, by the interface component 168, the metadata component 164 and the provisioning component 166. At block 205, the interface component 168 receives a request for configuration metadata for a network device. The network device may or may not be present in the networked computing environment 100. The request may be a standalone request. It may also be included in a request to provision a specified network device. The request may be received from a client 104, from a network device 110, or from any component of the networked computing environment 100.

The request may include information relating to the network device, such as certain device-specific information. For example, information associated with a hardware component of the network computing device. These hardware components may include, but are not limited to, a memory capacity, memory partitioning criteria, a deployment functionality, a network interface controller (NIC), a central processing unit (CPU), a computing device basic input/output system (BIOS), computing device firmware, a motherboard, a daughterboard, an expansion board, a bus, a computer readable media drive, a memory, a storage device, a computer display, an input or output interface, or a computing device enclosure. Device-specific information may also include any software information associated with hardware components of the network computing device.

Device-specific information may further include information associated with one or more performance benchmarks of the network device or its physical computing component. Illustratively, benchmark information may be based on heuristics including but not limited to processor performance; energy usage; bus speed; drive or data storage component throughput or seek time; network bandwidth, throughput, or latency to one or more remote or local network locations; or other benchmark data associated with the network device.

The request may also include information relevant to a network location associated with the network device, for example, information related to a logical or physical location in a network or data center, respectively. Illustratively, a logical or physical location may be inferred or otherwise determined from information, including, but not limited to, a physical network address (e.g., MAC address), a logical network address (e.g., a dynamic IP address or a or static IP address), a subnet, a network gateway, a domain name server, a network location, a number of hops to a network location, routing information, a logical or physical group identifier, a rack identifier, a serial number or ID corresponding to one or more components of the physical computing device, a data storage location, or any other information that may indicate or be used to infer a logical or physical location. The request may further include information relating to provisioning requirements or purposes, for example, device or network functionalities, such as network protocols, that are to be supported or provided by the network device.

At block 210, applicable configuration data for the network device is identified. The identification of configuration metadata may be based on the network location information or device-specific information associated with the network device, other information included in the request received at block 205, etc. In one embodiment, identifying applicable configuration metadata includes requesting the metadata from the metadata component 164. In this case, the metadata component 164 may retrieve applicable configuration metadata from an accessible data store, or, generating appropriate configuration metadata based on relevant network topology data as well as other applicable information. As described earlier, various indexing or organization mechanisms can be implemented with the accessible data store to facilitate the identification and retrieval of appropriate configuration metadata. Alternatively, or in addition, identifying applicable configuration metadata may include obtaining the metadata from a client 104.

As described above, the configuration metadata may indicate lower or upper bounds of memory required for a corresponding routing table, criteria for memory allocation, one or more schemes or layout of the corresponding routing table and any other information that may facilitate provisioning of network devices. The configuration metadata may also include any information contributing to the allocation of any hardware or software resources associated with the network device. For example, the allocation of resources related to NIC, CPU, BIOS, firmware, motherboard, daughterboard, expansion board, bus, computer readable media drive, storage device, computer display, input or output interface, computing device enclosure, energy usage; network bandwidth, associated remote or local network locations, etc., and any associated software resources.

At block 215, the provisioning component 166 generates configuration instructions for the network device based on the identified configuration metadata. For example, if the configuration metadata specifies an efficient allocation of memory partition to accommodate a routing table, the provisioning component 166 may generate code executable at the network device 110 when it reboots. The code, when executed by the network device, facilitates or accomplishes the rendering of the efficient allocation in a configurable memory portion of the network device. As another example, the provisioning component 166 may generate high-level code which may need to be compiled or otherwise converted before execution. As still another example, the configuration instructions may be pseudo code or other human-readable instructions.

The configuration instructions may include any information applicable to the configuration of the network device. For example, the configuration instruction may specify parameters or other configuration information to be used by a configuration process applicable to the network computing device, or may identify local process of the network computing device. The configuration instructions may also indicate sources or mechanisms whereby necessary information can be obtained for configuring the network device. For example, the configuration instructions may refer to other executable code or interface instructions that can facilitate the configuration of the network device.

At block 220, the network management service 102 causes configuration of the network device based on the configuration instructions. Illustratively, if the network device is present in the networked computing environment 100, the configuration instructions may be transmitted from the network device management service 102 to the network device 110. Alternatively, or in addition, the configuration instructions may be transferred from a local storage device (e.g., a local hard drive or USB key). In one embodiment, upon applicable conversion, such as being compiled by a local compiler, the configuration instructions can be executed by the network device for provisioning itself. Alternatively, or in addition, the configuration instructions can be transmitted to a client 104 that requests provisioning of the network device. Further, the provisioning component 166 or another component of the network device management service 102 may execute the configuration instructions and cause the network device 110 to be provisioned. Routine 200 ends at block 225.

Example Client Provisioning Routine

Figure 3:
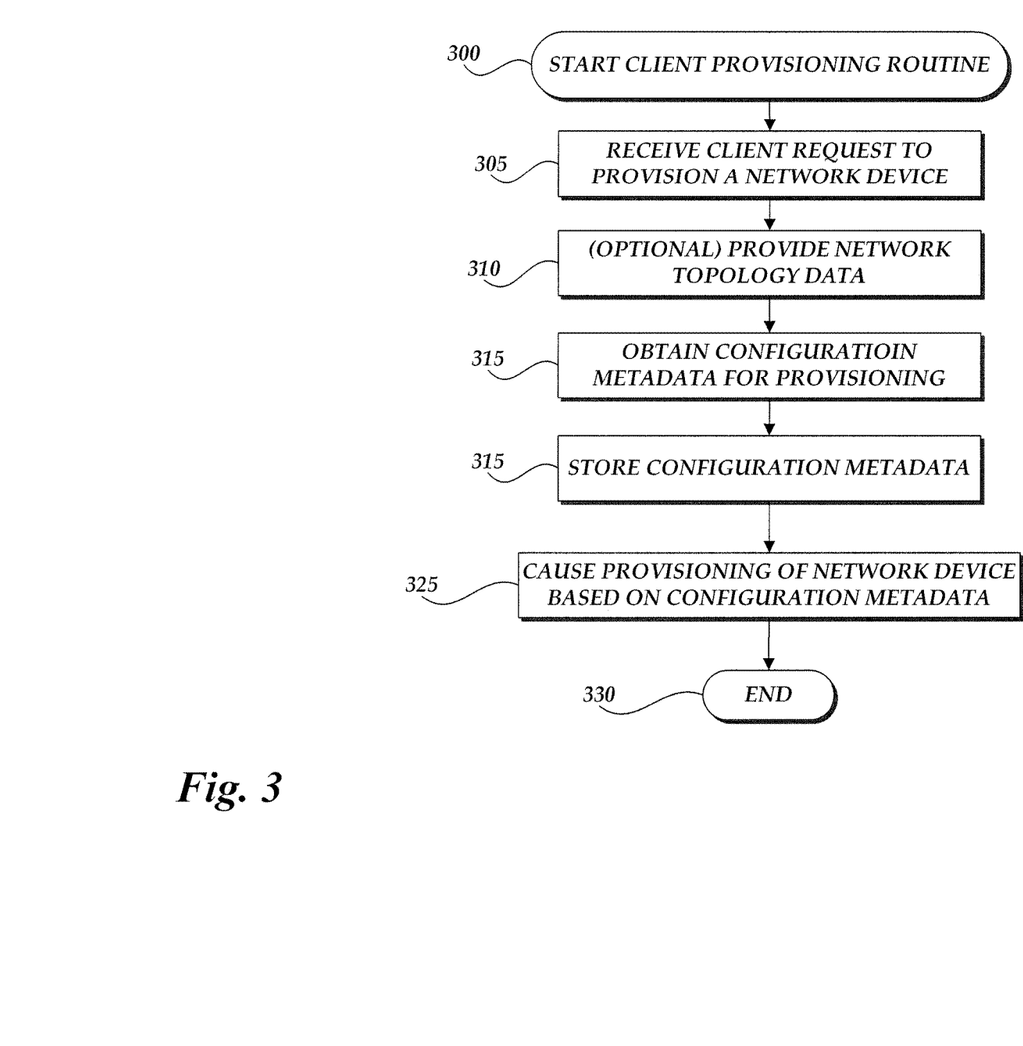
FIG. 3 is a flow diagram illustrative of an embodiment of a client provisioning routine.

FIG. 3 is a flow diagram illustrative of an embodiment of a client provisioning routine 300. Routine 300 can be implemented by one more components of the network device management service 102, for example, by the interface component 168, the network topology data store 162, the metadata component 164 and the provisioning component 166. At block 305, the interface component 168 receives a request to provision a network device from a client 104. The network device may or may not be present in the networked computing environment 100. The request may include network location information relevant to the deployment of the network device, for example, information associated with a logical or physical location in a network or data center, respectively. Illustratively, a logical or physical location may be inferred or otherwise determined from information, including, but not limited to, a physical network address (e.g., MAC address), a logical network address (e.g., a dynamic IP address or a or static IP address), a subnet, a network gateway, a domain name server, a network location, a number of hops to a network location, routing information, a logical or physical group identifier, a rack identifier, a serial number or ID corresponding to one or more components of the physical computing device, a data storage location, or any other information that may indicate or be used to infer a logical or physical location.

Optionally, at block 310, the network device management service 102 may provide network topology data to the requesting client 104 or another entity. Whether or which network topology data are provided may depend on the request to provision the network device. The request may request network topology data explicitly or implicitly. For example, if the request does not include network location information, the network device management service 102 may assume that the requesting party may need relevant network topology data to facilitate its analysis. The network device management service 102 may retrieve relevant network topology data from the network topology data store 162, based on the network location information included in the provisioning request. For example, the network device management service 102 may retrieve subpart of network topology configurations, such as Clos networks, regular mesh, hypercube, ring, 3D cube, 2D or 3D torus, as well other topologies and variations thereof, that are related to a location where the network device is to be deployed. The network topology configurations may indicate attributes or information of nodes and edges associated with the network device within the network topology, such as network functionalities that are supported, associated latency, bandwidth or other costs, etc. In some embodiments, the network device management service 102 can also generate and provide network topology data based on a proposed deployment location and relevant network topology data retrieved from the network topology data store 162. In such cases, the generated network topology data can be populated to the network topology data store 162 upon actual deployment of the network device at the proposed location.

At block 315, the network device management service 102 obtains configuration metadata for provisioning the network device. The configuration metadata can be obtained from the requesting client 104, from another client, or from any third party services or data stores. The configuration metadata may be obtained in response to the receipt of the network topology data by a client or another entity. In some embodiments, the requesting client 104 may generate applicable configuration metadata based on an analysis of the network topology data received. Alternatively, or in addition, applicable configuration metadata can be inputted by a human operator or administrator. As discussed earlier, the configuration metadata may indicate lower or upper bounds of memory required for accommodating a corresponding routing table, criteria for memory allocation, one or more schemes or layout of the corresponding routing table and any other information that may facilitate provisioning of network devices. Configuration metadata may also include any information contributing to the allocation of any other hardware or software resources associated with the network device.

At block 315, the metadata component 164 stores obtained configuration metadata in an assessable data store. In some embodiments, redundancy is checked prior to the storing of configuration metadata. Various indexing or other data organization mechanisms can be employed so that configuration metadata can be populated and retrieved efficiently, for example, based on categorization of network devices or network locations. At block 325, the network device management service 102 causes the provisioning of the network device based on the obtained configuration metadata. For example, configuration instructions for the network device can be generated to facilitate the provisioning. Routine 300 ends at block 330.

Example Configuration Metadata Generation Routine

Figure 4:
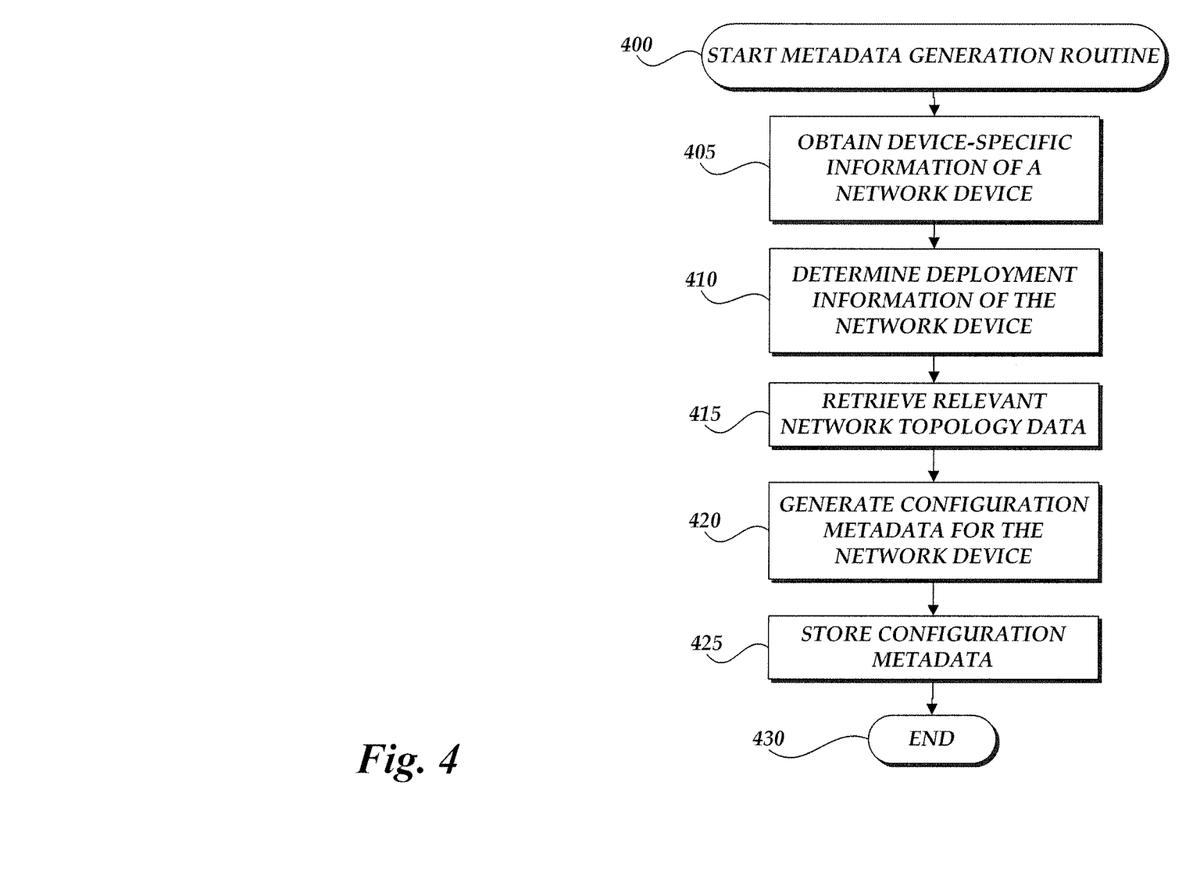
FIG. 4 is a flow diagram illustrative of an embodiment of a configuration metadata generation routine.

FIG. 4 is a flow diagram illustrative of an embodiment of a configuration metadata generation routing 400. Routine 400 can be implemented by one more components of the network device management service 102, for example, by the interface component 168, the network topology data store 162, and the metadata component 164. At block 405, the interface component 168 obtains device-specific information of a network device. The device-specific information may be obtained via data exchange from another device, in response to a request for such information transmitted by the interface component 168. For example, the device-specific information can be obtained from the network device 110 via the communication network 106, if the device is present in the networked computing environment 100. Alternatively, or in addition, the device-specific information can be obtained from one or more clients 104, for example, by way of a client's request to provision the network device.

As described above, the device-specific information can include information associated with a hardware component of the network computing device. These hardware components may include, but are not limited to, a memory capacity, memory partitioning criteria, a deployment functionality, a network interface controller (NIC), a central processing unit (CPU), a computing device basic input/output system (BIOS), computing device firmware, a motherboard, a daughterboard, an expansion board, a bus, a computer readable media drive, a memory, a storage device, a computer display, an input or output interface, or a computing device enclosure. The device-specific information may also include any software information associated with hardware components of the network computing device. The device-specific information may further include information associated with one or more performance benchmarks of the network device or its physical computing component. Illustratively, benchmark information may be based on heuristics including but not limited to processor performance; energy usage; bus speed; drive or data storage component throughput or seek time; network bandwidth, throughput, or latency to one or more remote or local network locations; or other benchmark data associated with the network device.

At block 410, the network device management service 102 determines deployment information of the network device. If the network device 110 is currently present in the networked environment 100, determining deployment information can simply be an inquiry of information related to the current functionality, logical or physical location of the network device 110, via the communication network 106. A logical or physical location may be inferred or otherwise determined from information, including, but not limited to, a physical network address (e.g., MAC address), a logical network address (e.g., a dynamic IP address or a or static IP address), a subnet, a network gateway, a domain name server, a network location, a number of hops to a network location, routing information, a logical or physical group identifier, a rack identifier, a serial number or ID corresponding to one or more components of the physical computing device, a data storage location, or any other information that may indicate or be used to infer a logical or physical location. Alternatively, or in addition, one or more clients 104 may provide data including, or facilitating the determination of, the deployment information of the network device. For example, the client 104 may provide to the network management service 102 data related to deployment requirements or purposes, for example, whether the network device is to add, support, reinforce, backup or modify certain network functionalities associated with a specified subpart of the networked environment 100. In such cases, the network device management service 100 may infer functionality, logical or physical location information based on the data provided by the client 104.

At block 415, the network management service 102 retrieves relevant network topology data based on the determined deployment information. The network device management service 102 may retrieve relevant network topology data from the network topology data store 162, based on network location information included in the determined deployment information. For example, the network device management service 102 may retrieve subpart of network topology configurations, such as Clos networks, regular mesh, hypercube, ring, 3D cube, 2D or 3D torus, as well other topologies and variations thereof, that are related to a logical location where the network device is to be deployed. In some embodiments, the network device management service 102 can also generate and provide network topology data based on a proposed deployment location and relevant network topology data retrieved from the network topology data store 162. In such cases, the generated network topology data can be populated to the network topology data store 162 upon actual deployment of the network device at the proposed location.

At block 420, the network management service 102 generates configuration metadata for the network device based on the relevant network topology data and the device-specific information. In some embodiments, lower or upper bounds of memory required for a corresponding routing table, criteria for memory allocation, one or more schemes or layout of the corresponding routing table and any other information that may assist in the process of memory partitioning can be generated. For example, an efficiently allocated equal-cost multipath (ECMP) group table can be generated based on the relevant network topology data. Distribution of group sizes of the efficiently allocated ECMP group table can then be derived therefrom. Utilizing the device-specific information such as the memory partitioning restrictions associated with the network device, the network management service 102 may further generate memory allocation layout or schemes based on the distribution of group sizes. Still further, lower or upper bounds of memory required for accommodating the whole or part of the ECMP group table can be generated. In other embodiments, generated configuration metadata may also include information contributing to the allocation of any hardware or software resources associated with the network device, which may facilitate its provisioning.

At block 425, the network management service 102 stores the configuration metadata. This can be accomplished by the metadata component 164, which may store the configuration metadata in an assessable data store. In some embodiments, redundancy is checked prior to the storing of configuration metadata. Various indexing or other data organization mechanisms can be employed so that configuration metadata can be populated and retrieved efficiently, for example, based on categorization of network devices or network locations. Routine 400 ends at block 430.

Although many embodiments have been indicated as illustrative, the illustrative embodiments do not need to be combined or implemented together. As such, some illustrative embodiments do not need to be utilized or implemented in accordance with the scope of variations to the present disclosure.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in in-app circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A system for facilitating network device configuration comprising:
    a memory component for storing network topology data, and
    a network device management component in communication with the memory component and operable to:
        retrieve, from the memory component, network topology data relating to the device-specific information to determine deployment information of the network device within a network topology; and
        generate configuration metadata that facilitates configuration of the network device based, at least in part, on the network topology data.

2. The system of claim 1, wherein the network device management component is further operable to obtain information indicative of a purpose of deployment, wherein the configuration metadata is generated based on the information indicative of the purpose of deployment.

3. The system of claim 1, wherein the device-specific information includes information associated with a performance benchmark of the network device.

4. The system of claim 3, wherein the performance benchmark of the network device is based on at least one of processor performance, energy usage, bus speed, throughput, seek time, network bandwidth, or latency.

5. The system of claim 1, wherein the network topology data includes data associated with at least one of Clos networks, regular mesh, hypercube, ring, 3D cube, 2D torus or 3D torus.

6. The system of claim 1, wherein the network topology data includes at least one of: an actual, estimated, or expected network topology.

7. The system of claim 1, wherein the configuration metadata corresponds to information contributing to a utilization of software resources associated with the network device.

8. The system of claim 1, wherein the configuration metadata includes at least one of lower or upper bounds of memory required for a corresponding routing table, criteria for memory allocation, or one or more schemes or layouts of the corresponding routing table.

9. The system of claim 1, wherein the network device management component is further operable to cause provision of the network device based, at least in part, on the configuration metadata.

10. The system of claim 9, wherein the network device management component causes provision of the network device by generating configuration instructions for the network device based, at least in part, on the configuration metadata.

11. The system of claim 10, wherein the configuration instructions comprise computer executable instructions, that when executed by the network device, causes the provisioning of the network device.

12. A computer-implemented method for facilitating network device configuration comprising:
    retrieving network topology data based on device-specific information included in a request for configuration metadata; and
    generating configuration metadata that facilitates configuration of a network device based, at least in part, on the network topology data.

13. The computer-implemented method of claim 12 further comprising obtaining the device-specific information from a human operator.

14. The computer-implemented method of claim 12 further comprising automatically generating the device-specific information.

15. The computer-implemented method of claim 14, wherein the device-specific information is based on a categorization of the network device.

16. The computer-implemented method of claim 12 further comprising processing the generated configuration metadata to remove one or more redundant portions in the generated configuration metadata.

17. The computer-implemented method of claim 12, wherein the device-specific information includes information associated with at least one of a memory capacity, memory partitioning criteria, a deployment functionality, a network interface controller (NIC), a central processing unit (CPU), a computing device basic input/output system (BIOS), a computing device firmware, a motherboard, a daughterboard, an expansion board, a bus, a computer readable media drive, a memory, a storage device, a computer display, an input or output interface, or a computing device enclosure.

18. The computer-implemented method of claim 12 further comprising determining attributes of nodes and edges associated with the network device within the network topology data in accordance with deployment information of the network device.

19. The computer-implemented method of claim 12 further comprising causing provision of the network device based, at least in part, on the configuration metadata.

20. The computer-implemented method of claim 19, wherein causing provision of the network device comprises generating configuration instructions for the network device based, at least in part, on the configuration metadata.

21. The computer-implemented method of claim 20, wherein the configuration instructions comprise computer executable instructions, that when executed by the network device, causes the provisioning of the network device.

* * * * *